(12) United States Patent
Meng et al.

(10) Patent No.: US 12,388,084 B1
(45) Date of Patent: Aug. 12, 2025

(54) PREPARATION METHOD FOR MANGANESE-ZINC-IRON-BASED CATHODE MATERIAL FOR SODIUM-ION BATTERY BY RECYCLING SPENT ZINC-MANGANESE BATTERY

(71) Applicant: Gannan Normal University, Ganzhou (CN)

(72) Inventors: Junxia Meng, Ganzhou (CN); Lina Zhang, Ganzhou (CN); Xiaokang Li, Ganzhou (CN); Lishuang Xu, Ganzhou (CN); Jie Huang, Ganzhou (CN)

(73) Assignee: Gannan Normal University, Ganzhou (CN)

( * ) Notice: Subject to any disclaimer, the term of this patent is extended or adjusted under 35 U.S.C. 154(b) by 0 days.

(21) Appl. No.: 19/006,265

(22) Filed: Dec. 31, 2024

(30) Foreign Application Priority Data

Sep. 2, 2024 (CN) .......................... 202411217375.3

(51) Int. Cl.
*H01M 4/505* (2010.01)
*C01G 49/00* (2006.01)
*H01M 6/52* (2006.01)

(52) U.S. Cl.
CPC ........ *H01M 4/505* (2013.01); *C01G 49/0072* (2013.01); *H01M 6/52* (2013.01); *C01P 2002/50* (2013.01); *C01P 2002/72* (2013.01); *C01P 2006/40* (2013.01)

(58) Field of Classification Search
CPC ...................................................... H01M 6/52
See application file for complete search history.

(56) References Cited

FOREIGN PATENT DOCUMENTS

| CN | 110752384 A | 2/2020 |
|---|---|---|
| CN | 115611321 A | 1/2023 |
| CN | 117613229 A | 2/2024 |
| DE | 102004013531 A1 | 9/2004 |

*Primary Examiner* — Peter F Godenschwager
(74) *Attorney, Agent, or Firm* — Bayramoglu Law Ofices LLC

(57) ABSTRACT

A preparation method for manganese-zinc-iron-based cathode material for a sodium-ion battery by recycling spent zinc-manganese battery is provided. A general formula of the manganese-zinc-iron-based cathode material for sodium-ion battery is $Na_nMn_{1-x-y}Zn_xFe_yO_2$, $0.3<n\le1.0$, $0.01<x\le0.5$, and $0.01<y\le0.5$. In the preparation method, after the manganese-zinc-iron material of spent zinc-manganese battery is leached out by a solution leaching method, the impurity is removed by a displacement method, and the appropriate material is added according to the composition ratio of manganese-zinc-iron-based cathode material for sodium ion battery to prepare the manganese-zinc-iron-based cathode material product for sodium ion battery. The sodium ion cathode material has excellent electrochemical performance and high-added value of the product, and avoids the problem of high energy consumption and low separation purity caused by the separation of manganese-zinc-iron in the recycling process of spent zinc-manganese battery.

7 Claims, 3 Drawing Sheets

PREPARATION METHOD FOR MANGANESE-ZINC-IRON-BASED CATHODE MATERIAL FOR SODIUM-ION BATTERY BY RECYCLING SPENT ZINC-MANGANESE BATTERY

CROSS REFERENCE TO THE RELATED APPLICATIONS

This application is based upon and claims priority to Chinese Patent Application No. 202411217375.3, filed on Sep. 2, 2024, the entire contents of which are incorporated herein by reference.

TECHNICAL FIELD

The present invention relates to the technical field of recycling of electronic waste, in particular to a preparation method for manganese-zinc-iron-based cathode material for a sodium-ion battery by recycling spent zinc-manganese battery.

BACKGROUND

The zinc-manganese dry battery is the most widely used consumer primary battery with the advantages of low cost and large capacity. The annual consumption of zinc-manganese batteries worldwide is about 14 billion, and is still increasing. While the spent zinc-manganese batteries contain a large amount of manganese, zinc and other heavy metal elements, and an improper treatment of a large number of spent zinc-manganese batteries will cause soil, water and air pollution. Therefore, it is very important to develop an economically feasible recycling and high-value utilization technology, and the recycling spent zinc-manganese batteries to prepare functional materials has gradually become a research hotspot.

However, the spent zinc-manganese dry battery contains manganese, zinc, iron, copper and other heavy metals, the conventional recycle method is too complex, there is also the problems of high recycling cost and low added value, and most of the recycle methods are only for the specific metal in the spent battery recycle, while the secondary pollution problems still exist in the recycling process, consequently, it is not conducive to the promotion and application in practical engineering.

The spent zinc-manganese battery contains more manganese and zinc. Generally, manganese is recycled to prepare $MnSO_4$ or $MnCO_3$; the zinc is recycled to prepare zinc chloride. Although the above-mentioned products prepared by recycling have a large demand in industrial production and a wide range of applications, these products belong to the most basic raw materials in industrial production with a low-added value; additionally, the recycling process tends to involve complex separation and purification processes, and the recycle is costly. This directly affects the efficiency of industrial production, so the recycle of zinc-manganese batteries is difficult to have a large-scale development in industrial production. Therefore, it is necessary to develop new low-cost recycling processes and high-added value recycling products, high value-added products are synthesized by increasing the create value of product recycling, and improving the technical content of production, so as to achieve the purpose of reducing costs and increasing efficiency.

SUMMARY

For the problems of the complex separation process, high energy consumption, and high cost in the existing recycling zinc-manganese battery technology, and low-added value of recycled products, the present invention provides a preparation method for manganese-zinc-iron-based cathode material for sodium-ion battery by recycling spent zinc-manganese battery.

In order to achieve the above objective, the present invention provides a manganese-zinc-iron-based cathode material for sodium-ion battery, a general formula of the manganese-zinc-iron-based cathode material for sodium-ion battery is $Na_nMn_{1-x-y}Zn_xFe_yO_2$, $0.3<n\leq1.0$, $0.01<x\leq0.5$, and $0.01<y\leq0.5$.

A preparation method for manganese-zinc-iron-based cathode material for sodium-ion battery as described above, the preparation method includes the following steps:

S1, recycling spent zinc-manganese batteries and crushing the spent zinc-manganese batteries to prepare first battery powder;

S2, washing and filtering the first battery powder to obtain a first solution and a second battery powder respectively;

S3, drying, sorting and purifying the second battery powder to obtain third battery powder;

S4, adding a strong acid solution and a co-solvent into an aqueous solution of the third battery powder, adding metal zinc powder, iron powder or manganese powder according to a stoichiometric ratio in the general formula $Na_nMn_{1-x-y}Zn_xFe_yO_2$ to adjust a metal ratio of manganese, zinc and iron in the third battery powder, stirring to react completely, filtering to obtain filter residue and a second solution;

S5, taking the first solution as an alkaline solution and a complexing agent, and the second solution as a metal liquid to carry out a co-precipitation reaction, obtaining manganese-zinc-iron hydroxide after filtering, washing and drying;

S6, mixing manganese-zinc-iron hydroxide and sodium salt, and synthesizing the manganese-zinc-iron-based cathode material for sodium-ion battery by calcining at high temperature.

Preferably, in step S2, washing conditions are: deionized water, a water temperature of 20-100° C., and an amount of water used is 0.1-10 times a mass of the first battery powder.

Preferably, in step S3, a drying temperature is 80° C., and the sorting is air separation and screening, wherein the screening uses a vibrating screen with a mesh aperture of 10-300 mesh.

Preferably, in step S4, the co-solvent includes one or several combinations of sodium sulfite, sodium thiosulfate, hydrogen peroxide solution, hydrazine hydrate, and ascorbic acid.

Preferably, in step S6, the sodium salt includes one or several combinations of sodium hydroxide, sodium carbonate, sodium bicarbonate, sodium nitrate, and sodium oxalate.

Preferably, in step S6, a molar ratio of manganese-zinc-iron hydroxide to sodium salt is: (Mn+Zn+Fe):Na=1.0:(0.3-1.05).

Preferably, in step S6, high-temperature calcination conditions are: under air or oxygen conditions, calcining for 1-24 hours at a temperature of 200-500° C., and calcining for 1-48 hours at a temperature of 600-1000° C.

The preparation method for manganese-zinc-iron-based cathode material for sodium-ion battery by recycling the spent zinc-manganese battery of the present invention has the following beneficial effects:

(1) using the elements which include manganese, zinc and iron inherent in the spent zinc-manganese batteries to directly synthesize the high value-added sodium manganese-zinc-iron cathode materials for sodium-ion battery;

(2) avoiding the complex separation procedure of the main elements manganese, zinc and iron in the recycling process, and reducing the recycle cost;

(3) reasonably utilizing the main ingredients of manganese dioxide, metal zinc, iron sheet, potassium hydroxide and ammonium chloride in spent zinc-manganese batteries by the method of the present invention, which has a high recycling rate and fewer secondary pollutants.

Further detailed descriptions of the technical scheme of the present invention can be found in the accompanying drawings and embodiments.

DETAILED DESCRIPTION OF THE EMBODIMENTS

In order to make the objective, technical solution and advantages of the present invention clearer and more specific, the present invention will be further described in detail below with reference to accompanying drawings and embodiments. It should be understood that the specific embodiments described herein are merely illustrative of the present invention and are not intended to limit the embodiments of the present invention. Based on the embodiments in the present invention, all the other embodiments obtained by a person of ordinary skill in the art without involving any inventive effort fall within the scope of protection of the present invention.

Embodiment 1

Figure 1:
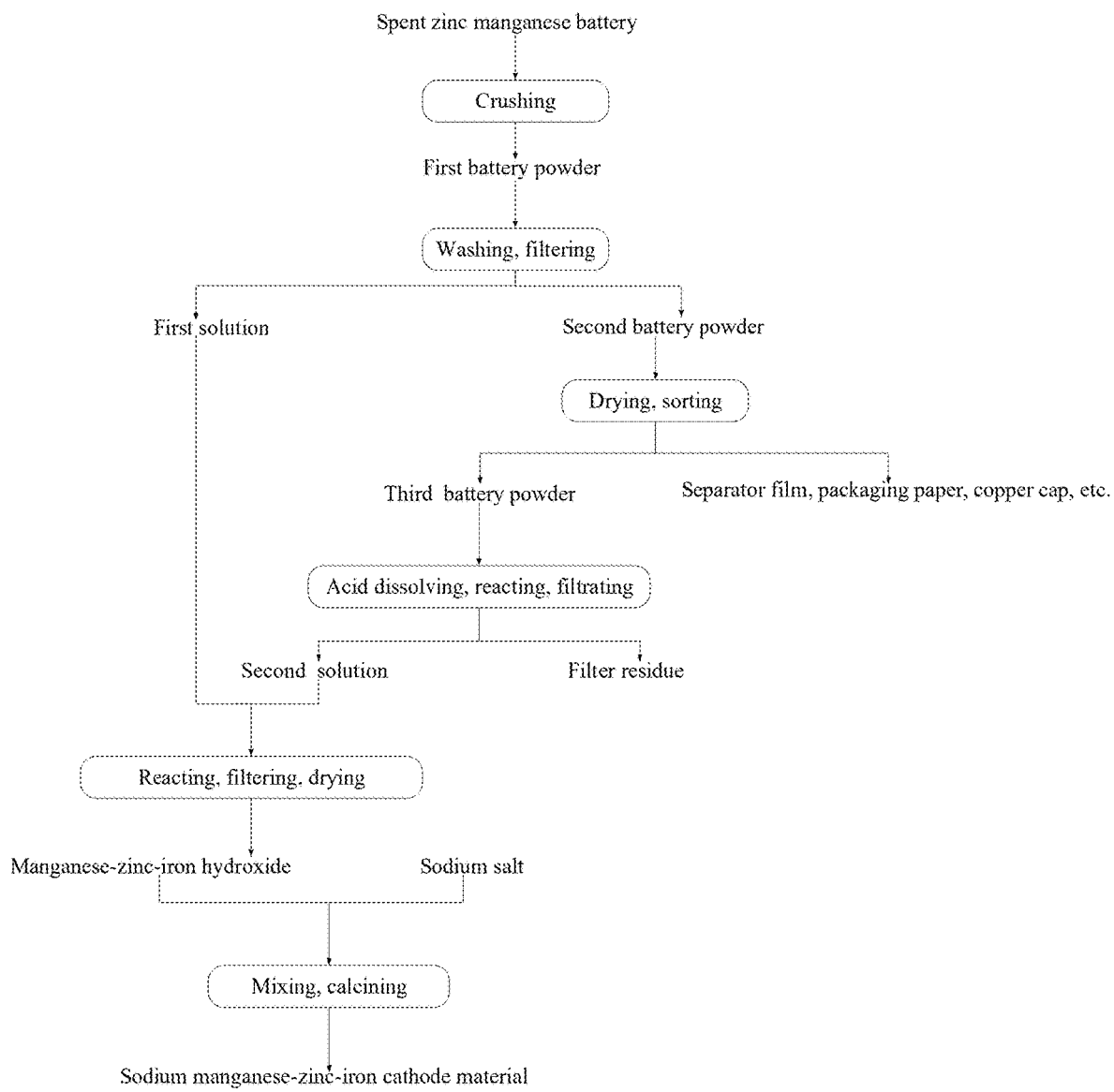
FIG. 1 is a flowchart of a preparation method for manganese-zinc-iron-based cathode material for sodium-ion battery by using spent zinc-manganese battery according to embodiment 1 of the present invention.

A preparation method for manganese-zinc-iron-based cathode material for sodium-ion battery by recycling spent zinc-manganese battery, the process is shown in FIG. 1, which includes the following steps:

(1) A 1.0 kg of spent zinc-manganese battery was put into a crusher to be crushed, and the 0.96 kg of first battery powder was obtained after crushing.

(2) The first battery powder was washed and filtered with 500 mL of deionized water at 55° C. to obtain 473 mL of the first solution and 1.18 kg of the second battery powder.

(3) The second battery powder was dried in a blast drying oven at 80° C. for 12 h, firstly, the separator film was removed by the air separator, secondly, the copper cap and iron cylinder were removed by a 100-mesh vibrating screen to obtain the 0.672 kg of third battery powder.

(4) 100 g of the third battery powder was taken into a 1.0 L of reactor, 100 mL of deionized water base solution was added, and stirred evenly, then 200 mL of dilute sulfuric acid with a concentration of 2.5 mol/L and 15 mL of hydrogen peroxide solution with a concentration of 20% were added, stirred and dissolved completely, 4.8 g of metal zinc powder and 13.5 g of metal iron powder were added to adjust the metal ratio of manganese, zinc and iron to 0.5:0.25:0.25, and stirred to react completely, 18.4 g of filter residue and 304 mL of the second solution are obtained after filtration.

(5) The first solution was used as the base solution to configure 500 mL of alkaline solution containing 2.0 mol/L potassium hydroxide and 0.2 mol/L ammonia, and the second solution was used as the base solution to configure 250 mL of 2.0 mol/L manganese-zinc-iron metal liquid, the alkaline solution and metal liquid were added to the reactor at a constant liquid feeding rate by using a constant flow pump, the pH value was controlled at 9.2, the reaction temperature was controlled at 60° C., and the stirring speed was controlled at 300 r/min to carry out the co-precipitation reaction for 5 h, and the manganese-zinc-iron hydroxide was obtained after filtering, washing and drying.

(6) 11.6 g of manganese-zinc-iron hydroxide and 7.42 g of sodium carbonate were mixed evenly, and calcined at 450° C. for 6 h under air conditions, however, the temperature was increased to 920° C. and calcined for 12 h to synthesize sodium manganese-zinc-iron cathode materials for sodium-ion battery $Na_{0.7}Mn_{0.5}Zn_{0.25}Fe_{0.25}O_2$.

Figure 2:
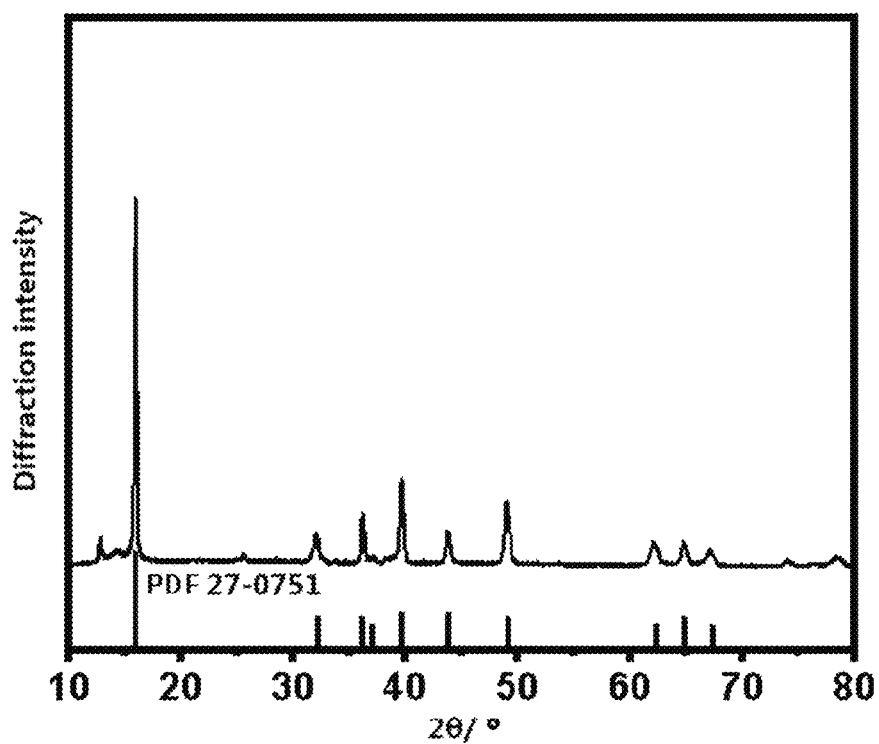
FIG. 2 is an X-ray diffraction (XRD) pattern of a manganese-zinc-iron-based cathode material for sodium-ion battery according to embodiment 1 of the present invention.

The XRD spectrum of a P2-type layered structure of sodium manganese-zinc-iron cathode materials for sodium-ion battery $Na_{0.7}Mn_{0.5}Zn_{0.25}Fe_{0.25}O_2$ is shown in FIG. 2; it can be seen from the image that the structure of the obtained sodium manganese-zinc-iron cathode materials for sodium-ion battery shows the layered P2 phase $Na_{0.7}Mn_{0.5}Zn_{0.25}Fe_{0.25}O_2$ structure.

The P2-type layered-structure sodium manganese-zinc-iron cathode materials for sodium-ion battery $Na_{0.7}Mn_{0.5}Zn_{0.25}Fe_{0.25}O_2$ prepared in this embodiment is used as the cathode active material of the sodium ion battery to prepare the battery, the specific steps are:

the sodium ion button battery was prepared by using sodium ion manganese-based cathode material as positive active material, metal sodium sheet as negative electrode, 1 mol/L $NaPF_6$ and EC/DMC (volume ratio 1:1) as electrolyte.

Figure 3:
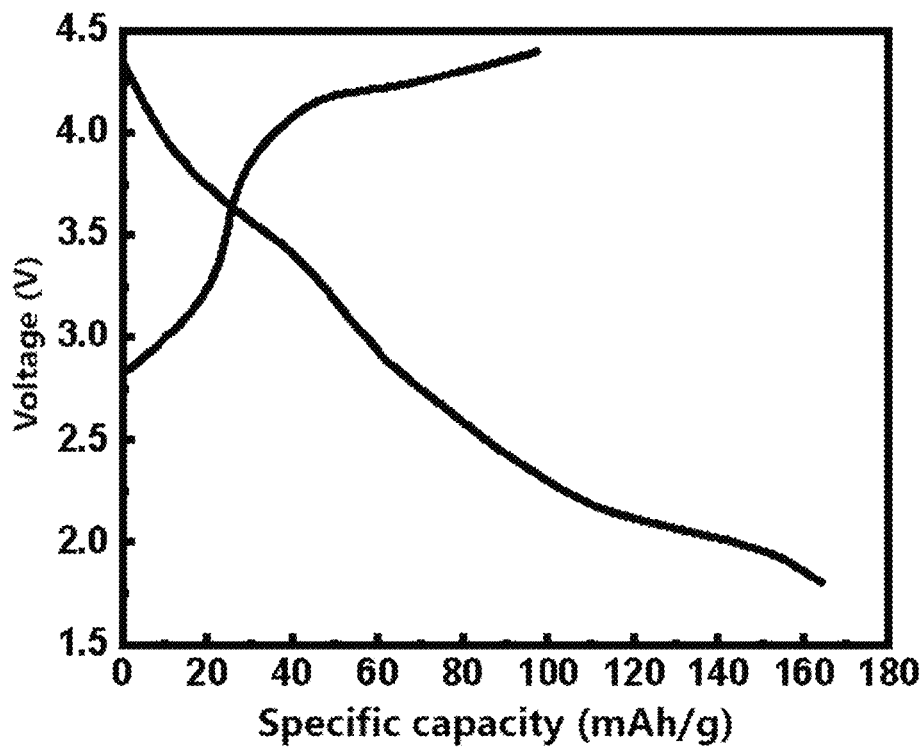
FIG. 3 is a first charge-discharge curve diagram of a manganese-zinc-iron-based cathode material for sodium-ion battery according to embodiment 1 of the present invention.
Figure 4:
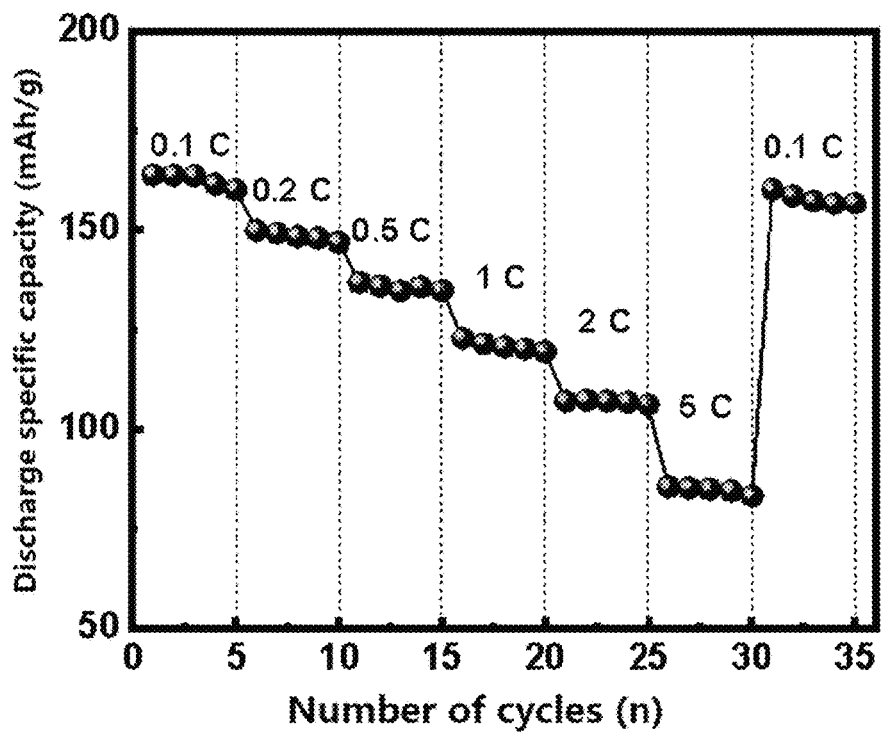
FIG. 4 is a rate performance diagram of a manganese-zinc-iron-based cathode material for sodium-ion battery according to embodiment 1 of the present invention.
Figure 5:
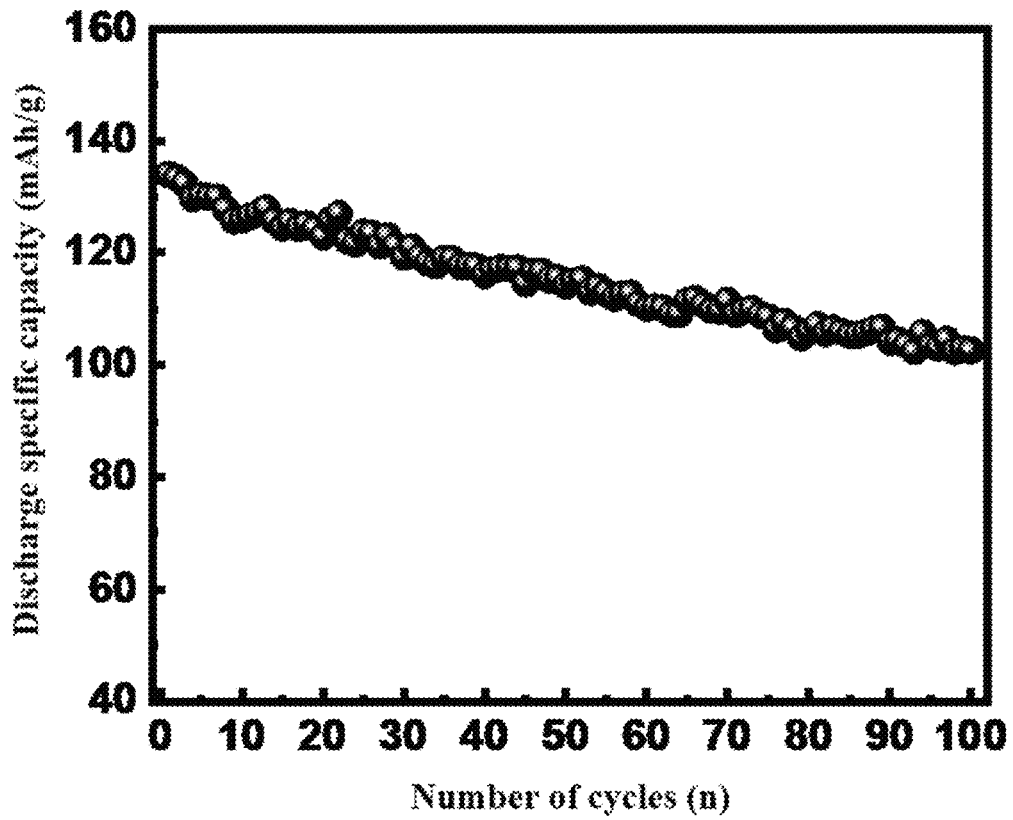
FIG. 5 is a cycle performance diagram of a manganese-zinc-iron-based cathode material for sodium-ion battery according to embodiment 1 of the present invention.

The first charge-discharge curve, rate performance and cycle performance of the battery were tested, and the results were shown in FIGS. 3-5, respectively. It is concluded that the sodium manganese-zinc-iron cathode materials for sodium-ion battery have a higher initial discharge capacity (164 mAh/g); it has excellent rate performance, and the discharge capacity can still reach 85 mAh/g under the condition of 5C (500 mA/g) current charge and discharge; and it has good cycle performance, and the capacity retention rate is 77% after 100 charge and discharge cycles at a current density of 0.5C.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. A preparation method for a manganese-zinc-iron-based cathode material for a sodium-ion battery, wherein
a general formula of the manganese-zinc-iron-based cathode material for the sodium-ion battery is $Na_n Mn_{1-x-y}Zn_xFe_yO_2$, $0.3<n\le1.0$, $0.01<x\le0.5$, and $0.01<y\le0.5$;
the preparation method for the manganese-zinc-iron-based cathode material for the sodium-ion battery comprises the following steps:
S1, recycling spent zinc-manganese batteries and crushing the spent zinc-manganese batteries to prepare a first battery powder;
S2, washing and filtering the first battery powder to obtain a first solution and a second battery powder respectively;
S3, drying, sorting and purifying the second battery powder to obtain a third battery powder;
S4, adding a strong acid solution and a co-solvent into an aqueous solution of the third battery powder, adding a metal zinc powder, iron powder, or manganese powder according to a stoichiometric ratio in the general formula $Na_nMn_{1-x-y}Zn_xFe_yO_2$ to adjust a metal ratio of manganese, zinc, and iron in the third battery powder, stirring to react completely, filtering to obtain a filter residue and a second solution;
S5, making an alkaline solution by adding potassium hydroxide and ammonia to the first solution, and subjecting the alkaline solution and the second solution comprising manganese, zinc and iron to a co-precipitation reaction, obtaining manganese-zinc-iron hydroxide after filtering, washing, and drying; and
S6, mixing the manganese-zinc-iron hydroxide and a sodium salt, and synthesizing the manganese-zinc-iron-based cathode material for the sodium-ion battery by a calcining process.

2. The preparation method for the manganese-zinc-iron-based cathode material for the sodium-ion battery according to claim 1, wherein in the step S2, washing conditions are: deionized water, a water temperature of 20-100° C., and an amount of the deionized water used is 0.1-10 times a mass of the first battery powder.

3. The preparation method for the manganese-zinc-iron-based cathode material for the sodium-ion battery according to claim 1, wherein in the step S3, a drying temperature is 80° C., and the sorting is an air separation and a screening, wherein the screening uses a vibrating screen with a mesh aperture of 10-300 mesh.

4. The preparation method for the manganese-zinc-iron-based cathode material for the sodium-ion battery according to claim 1, wherein in the step S4, the co-solvent comprises at least one of sodium sulfite, sodium thiosulfate, a hydrogen peroxide solution, hydrazine hydrate, and ascorbic acid.

5. The preparation method for the manganese-zinc-iron-based cathode material for the sodium-ion battery according to claim 1, wherein in the step S6, the sodium salt comprises at least one of sodium hydroxide, sodium carbonate, sodium bicarbonate, sodium nitrate, and sodium oxalate.

6. The preparation method for the manganese-zinc-iron-based cathode material for the sodium-ion battery according to claim 1, wherein in the step S6, a molar ratio of the manganese-zinc-iron hydroxide to the sodium salt is: (Mn+Zn+Fe):Na=1.0:(0.3-1.05).

7. The preparation method for the manganese-zinc-iron-based cathode material for the sodium-ion battery according to claim 1, wherein in the step S6, the calcining process comprises: under air or oxygen conditions, calcining for 1-24 hours at a temperature of 200-500° C., and calcining for 1-48 hours at a temperature of 600-1000° C.

\* \* \* \* \*